3,264,667
PIT CLEANER FOR POULTRY CAGES
William C. Frank, Hyde Park, Ontario, Canada, assignor to Hyde Park Farm Supply Limited, Hyde Park, Ontario, Canada, a corporation of Ontario
Filed June 8, 1964, Ser. No. 373,350
3 Claims. (Cl. 15—93)

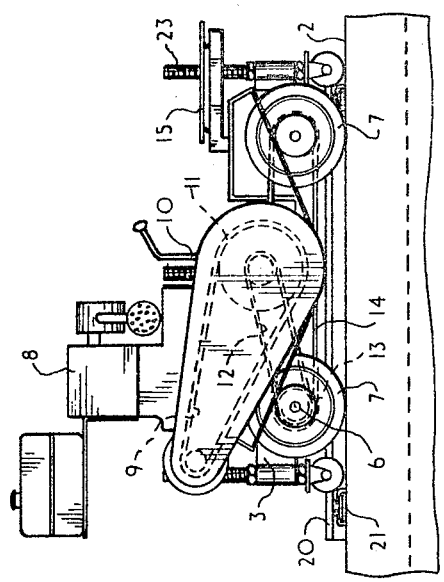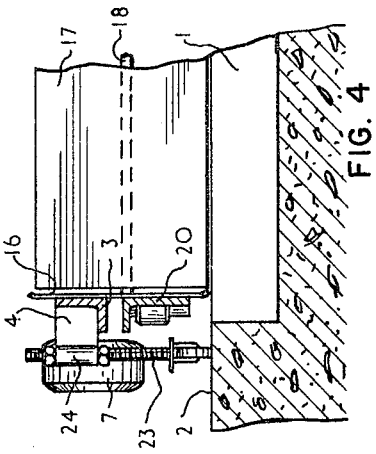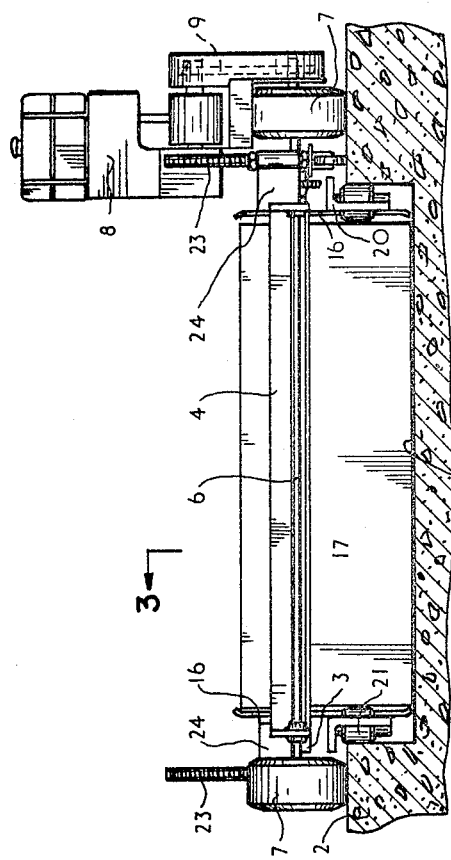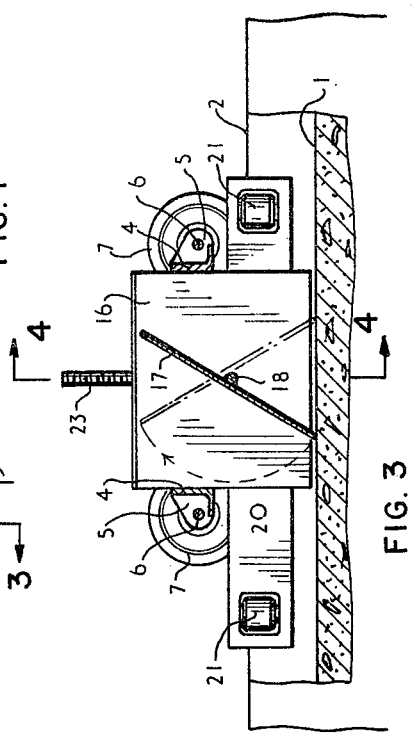

This invention relates to improvements in a pit cleaner for poultry cages and the like and appertains particularly to a mobile, wheel-carried unit designed to straddle the pit.

An object of the invention is to provide a compact, wheel-carried pit cleaner with a reversible blade, enabling the unit to operate in either direction, yet when backing up on any run allows the blade to float over the droppings.

A further object of the invention is to provide a pit cleaner mounted on a motor-operated four-wheel drive chassis whose wheels travel on the walks on opposite sides of the pit.

A further object of the invention is to provide a wheel-carried pit cleaner that straddles the pit, having self-steering pit-engaging guides.

A further object of the invention is to provide a wheel-carried pit cleaner that can be raised clear of the pit on castors for easy movement as from one pit to another or from building to building.

A still further object of the invention is to provide a power-driven, wheel-carried pit cleaner that straddles the pit and has an operator's seat on one side thereof affording the operator full view of the operation and complete control of the pit cleaner at all times.

To the accomplishment of these and related objects as shall become apparent as the description proceeds, the invention resides in the construction, combination and arrangement of parts as shall be hereinafter more fully described, illustrated in the accompanying drawings, and pointed out in the claims hereunto appended.

The invention will be best understood and can be more clearly described when reference is had to the drawings forming a part of this disclosure wherein like characters indicate like parts throughout the several views.

In the drawings:

FIGURE 1 is a front elevation of the pit cleaner, showing the droppings pit and elevated walk on each side thereof in cross section;

FIGURE 2 is a side elevation thereof;

FIGURE 3 is a longitudinal vertical section, on line 3—3 of FIGURE 1, showing the reversible scraper blade; and FIGURE 4 is a transverse vertical sectional detail as taken on line 4—4 of FIGURE 3 but with the cleaning unit raised clear of the pit, on its castors.

In poultry houses, it is now common construction to suspend elongated cages from the ceiling and to provide a long pit beneath each row or double row of cages to receive the droppings of the birds, an elevated walk occurring on opposite sides of the pit. It is not unusual for the cages to run a length of two hundred to two hundred and fifty feet and the underlying pit of the same length would normally be about four or four and one-half feet wide and approximately six inches deep. To clean the droppings from the pit in such an installation, housing two or three thousand hens, involves considerable work and calls for efficient machinery.

I have found a practical answer to the removal of cage droppings in a wheeled pit cleaner that straddles the pit running along under the suspended cages with the wheels travelling on the raised walks alongside the pit and with all four wheels of the cleaner being power driven.

The basic floor of the poultry house shown in the drawings, includes an elongated pit 1, having a horizontal base and parallel vertical sides with a walk 2 raised about six inches above the base of the pit and running along each side.

The pit cleaner comprises a rectangular frame formed of two deep longitudinal angle members 3 that serve as sides and two elongated and deep transverse angle members 4 that serve as opposite ends and carry bushings 5 in which a pair of cross axles 6 are journalled, as will be clearly seen in FIGURE 3. A rubber tired wheel 7 is keyed or otherwise fixed on the outer end of each axle.

A power unit such as a four cycle, five horsepower gasoline engine 8 is mounted on the frame at one side. A drive belt 9 connects its drive shaft, which may have a speed reducer, with the "forward," "neutral" and "reverse" transmission 10 and from a sprocket 11 on the transmission a chain drive 12 runs to a companion sprocket 13 on the forward axle 6. The two axles 6 are in turn connected by a sprocket chain 14 thereby providing for driving power being delivered to all four wheels 7. To the rear of the gear shift transmission 10, the operator's seat 15 is mounted above the frame.

The relatively wide cleaner is designed to straddle the pit 1 with the drive wheels 7 travelling on the raised walks 2 along opposite sides. On the inner face of each side frame angle member 3 and extending from the front to rear transverse frame angle members 4 is a vertical scraper apron 16 and extending across the cleaner frame from apron to apron is the scraper blade 17 carried on a transverse rod 18 on which such blade is free to rotate, as from the angular set shown in solid outline to that shown in dotted outline in FIGURE 3, thereby providing a reversible blade, operable in either direction as the pit cleaner moves along the pit yet free floating to ride over the droppings if the machine backs up, relative to the set of the blade, and to again dig in as the machine resumes its forward motion. It will be noted that though the wheels ride on the raised walks 2, the scraper 17 and the aprons 16 at the opposite ends thereof hang down into the pit 1 with the leading lower edge of the blade in forwardly sloping angular position sliding along on the horizontal base of the pit.

To render the cleaning unit self-steering while moving along the pit, I provide a longitudinally elongated guide 20 on the outer side of each apron 16, of angular form, with the upper arm of the angle facing outwardly and at an elevation just above the level of the raised walk 2. There is preferably slight clearance between the vertical arm of each angular guide and the confronting vertical side wall of the pit and near each end of each guide a roller 21 is mounted for engagement with the pit wall.

As it will be found desirable to move the cleaner from one pit to another or even from building to building, three vertically adjustable jackscrew type castors or dollies 23 are mounted in sockets 24 extended outwardly from the frame, one near each end on one side of the frame and the third one approximately midway of the opposite side. By raising the pit cleaner on these outwardly extended dollies that overlie the raised walks, until the scraper assembly is clear of the pit, as shown in FIGURE 4, the unit is easily moved about as desired, being able to pass sideways through doors of even relatively narrow width.

From the foregoing description taken in connection with the accompanying drawings, it will be manifest that a highly efficient, mobile, four-wheel drive, self-steering pit cleaner with a reversible floating action blade is provided that will fulfill all the necessary requirements of such a device, but as many changes could be made in the above description and many apparently widely different embodiments of the invention may be constructed within the scope of the appended claims, without departing from the spirit or scope thereof, it is intended that all matters contained in the said accompanying specification and drawings shall be interpreted as illustrative and not in a limitative or restrictive sense.

What is claimed as new is:

1. A poultry cage pit cleaner comprising a power driven wheeled frame designed to straddle the pit, a transverse scraper blade disposed between the sides of the frame and depending therebelow, an apron at each end of said blade, and self-steering pit engaging guides on the outside of each apron, wherein the blade is rotatably mounted midway between its longitudinal edges on a shaft with sufficient clearance therearound rendering the same reversible so that it may be operated in either direction and enabling the same to float over droppings in the pit on reverse movement.

2. For a poultry house having hanging cages and an underlying elongated pit in the floor with a raised walk along each side of the pit, a pit cleaner comprising a frame designed to straddle the pit, a pair of transverse axles journalled in said frame, a non-steerable wheel on each end of each axle, a power unit on said frame, positive drive connecting means between said power unit and said non-steerable wheels, a scraper assembly consisting of side aprons and an intermediate blade that are permanently mounted in said frame to depend to a level below said wheels, elongated, horizontal, self-steering guides fixed on the outer side of each of said depending scraper aprons and extending beyond the front and rear thereof, and rollers near opposite ends of each of said guides to engage the sides of the pit.

3. For a poultry house having hanging cages and an underlying elongated pit in the floor with a raised walk along each side of the pit, a pit cleaner comprising a frame designed to straddle the pit, a pair of transverse axles journalled in said frame, a non-steerable wheel on each end of each axle, a power unit on said frame, positive drive connecting means between said power unit and said non-steerable wheels, a scraper assembly consisting of side aprons and an intermediate blade that are permanently mounted in said frame to depend to a level below said wheels, and vertically adjustable dollies mounted on opposite sides of said frame engageable with the raised walks for elevating the pit cleaner and raising the permanently depending scraper clear of the pit whereby the pit cleaner may be moved about the poultry house with ease.

References Cited by the Examiner

UNITED STATES PATENTS

| 1,668,625 | 5/1928 | Boyer et al. | 172—24 X |
| 3,066,341 | 12/1962 | Becker | 15—93 |
| 3,160,141 | 12/1964 | Crutchfield | 15—93 |

FOREIGN PATENTS 60,522  2/1939  Norway.

CHARLES A. WILLMUTH, *Primary Examiner.*

LEON G. MACHLIN, *Assistant Examiner.*